United States Patent Office 3,010,912
Patented Nov. 28, 1961

3,010,912
STABILIZATION OF ORGANIC COMPOSITIONS WITH METAL DEACTIVATORS
Albert F. Hardman, Akron, Ohio, assignor to The Goodyear Tire & Rubber Company, Akron, Ohio, a corporation of Ohio
No Drawing. Filed June 10, 1959, Ser. No. 819,200
12 Claims. (Cl. 252—405)

The present invention relates to the stabilization of organic substances with metal deactivators. More particularly, it is concerned with the stabilization of organic substances which are subject to oxidative deterioration in the presence of a metal containing material which catalyzes the deterioration by the addition of small amounts of new, highly effective metal deactivators. Although the invention is particularly applicable to the stabilization of natural and synthetic rubbers, the newly discovered metal deactivating properties of the compounds to be fully described hereinafter may be also used to prevent oxidative deterioration of gasoline and other liquid fuels, lubricants, fats and oils, resins and other organic substances.

Many organic substances, and particularly rubber, unsaturated hydrocarbons, fats and oils, and many resins, are subject to the hazard of deterioration due to oxidation. This oxidation, in the case of rubbers, leads to loss of tensile strength, resiliency and other desired properties. Similarly, such oxidative deterioration destroys to a substantial extent many desired properties in other organic substances. The rate of the oxidative deterioration is usually increased when the organic substance is subjected to elevated temperatures or exposed to sunlight or other actinic light. However, a much greater increase in the deterioration is often brought about by the accidental inclusion of extraneous metallic materials in the organic substances. Thus, copper, manganese or iron metal or the salts thereof are inherently catalytic to the oxidation of most organic materials, and very small amounts of these metals or their salts often occur as impurities in organic compositions. Thus, the simple passage of organic compounds through metal pipe or tubing is often sufficient to cause enough metal or metal salt to be accidentaly included in the organic composition to catalyze the oxidative deterioration of the composition.

The catalytic effect of metal containing materials upon the oxidative deterioration of organic substances has been recognized for many years. Various expedients have been employed to mitigate the catalytic effect of metal containing materials, and probably the most successful approach to the solution of this problem has been the discovery and use of materials which in some fashion or other serve to deactivate the catalytic effect of the metal containing materials, and accordingly help to stabilize the metal contaminated organic substances against oxidative deterioration. A substantial number of these so-called metal deactivators have been developed and have been described in the technical literature and patents, for example, see U.S. Patents 2,181,121, 2,533,205 and 2,754,216. The search continues, however, for additional compounds which can effectively be used as metal deactivators in organic substances, particularly such materials which will be more efficient than the metal deactivators previously known, possess little or no tendency to discolor the organic substances to which they are added, have low toxicity, and have freedom from strong or objectionable odors.

A principal object of the present invention is the provision of new methods for the protection of organic substances against oxidative deterioration which is accelerated by the presence in the substance of small amounts of metal containing materials, particularly, Cu, Mn, Fe metal or salts. Further objects include:

(1) Provision of new means for deactivation of catalytic metals in organic substances to help retard oxidative deterioration of the substances and thereby stabilize them.

(2) The provision of new metal deactivators particularly useful in the stabilization of elastomeric materials, and which produce very little discoloration in white or light colored formulations of the elastomer.

(3) Provision of new and improved metal deactivators for use in inhibiting the deterioration of organic substances in the presence of metallic materials which normally tend to catalyze the oxidative deterioration of the organic substance.

(4) Provision of new compositions comprising an organic substance subject to oxidative deterioration, e.g., natural or synthetic rubber, gasoline, lubricating oils or greases, fuel oils, resins, fats and waxes, contaminated with an oxidation catalyzing metal or metal compound, and new, highly effective metal deactivators for inhibiting the catalytic effect of the metal or metal compounds on the oxidative deterioration.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished in accordance with the present invention by the addition of small amounts of o-hydroxy arylamino benzothiazoles or o-hydroxy arylamino benzoxazoles to organic compositions so as to act as metal deactivators in the compositions. It has been found that the addition of these compounds deactivates or suppresses the effects of contaminating metal components of the compositions, thereby inhibiting the catalytic acceleration of the oxidation deterioration of the organic substances in the compositions.

Normally, the organic composition which is to be protected against oxidative deterioration will include an anti-oxidant which has the property to retard oxidation naturally occurring, regardless of the presence of the contaminating metal material. However, the efficiency and overall results of such anti-oxidants is seriously retarded by the catalytic activity of the metal component. It has been discovered that the metal deactivators of this invention may be incorporated in organic compositions to permit the anti-oxidant to perform its intended purpose and at the same time to suppress any acceleration in the oxidation of the organic composition caused by the presence therein of the catalytic metal containing material.

The compounds which have been discovered to be highly effective as metal deactivators and usable in accordance with the present invention in the stabilization of organic substances are those having the following structure:

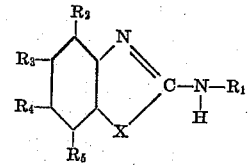

wherein
X is an oxy or thio radical, i.e., an —O— or —S— radical,
R₁ is an o-hydroxy aryl radical, particularly an o-hydroxy monocyclic aryl radical or an o-hydroxy bicyclic aryl radical and R$_2$, R$_3$, R$_4$ and R$_5$ are hydrogen or alkyl radicals, particularly hydrogen or C$_1$ to C$_4$ alkyl radicals.

The most effective compounds for the purpose of the invention are those having the structure:

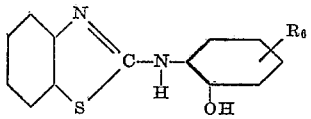

wherein R$_6$ is a hydrogen, halogen, hydroxy, C$_1$ to C$_6$ alkyl or C$_1$ to C$_6$ alkoxy radical. Specific examples of such compounds which may be used include 2-(2-hydroxyphenyl amino) benzothiazole, 2-(2-hydroxy-6-methyl phenyl amino) benzothiazole, 2-(2-hydroxy-5-hexylphenyl amino) benzothiazole, 2-(2-hydroxy-4-isobutylphenyl amino) benzothiazole, 2-(2-hydroxy-6-chloro phenyl amino) benzothiazole, 2-(2-hydroxy-4-bromo phenyl amino) benzothiazole, 2-(2-hydroxy-4-iodo phenyl amino) benzothiazole, 2-(2-hydroxy-3-fluoro phenyl amino) benzothiazole, 2-(2,6-dihydroxy phenyl amino) benzothiazole, 2-(2,3-dihydroxy phenyl amino) benzothiazole, 2-(2,5-dihydroxy phenyl amino) benzothiazole, 2-(2-hydroxy-3-methoxy phenyl amino) benzothiazole, 2-(2-hydroxy-6-n-butoxy phenyl amino) benzothiazole, 2-(2-hydroxy-4-ethoxyphenyl amino) benzothiazole and equivalent substituted 2-(2-hydroxy phenyl amino) benzothiazoles.

Another group of compounds usable as metal deactivators within the scope of the invention are the 2-hydroxy monocyclicaryl amino alkyl-substituted benziothiazoles including 2-(2-hydroxy phenyl amino)-4-methyl benzothiazole; 2-(2-hydroxy phenyl amino)-5-methyl benzothiazole; 2-(2-hydroxy phenyl amino)-6-hexyl benzothiazole; 2-(2-hydroxy phenyl amino)-7-dodecyl benzothiazole; 2-(2-hydroxy-4-methyl phenyl amino)-5-methyl benzothiazole; 2-(2-hydroxy-3-chloro phenyl amino)-6-ethyl benzothiazole; 2-(2-hydroxy-3,5-dichlorophenyl amino)-5-butyl benzothiazole; 2-(2-hydroxy-3-methoxy phenyl amino)-5-hexyl benzothiazole; 2-(2-hydroxy-3-ethoxy-5-methyl phenyl amino)-7-ethyl benzothiazole; 2-(2-hydroxy-4,6-dimethyl phenyl amino)-5-methyl benzothiazole; 2-(2,3-dihydroxy phenyl amino)-4-isopropyl benzothiazole; 2-(2-hydroxy phenyl amino)-5,6-dimethyl benzothiazole; 2-(2-hydroxy phenyl amino)-4,7-diethyl benzothiazole; 2-(2-hydroxy phenyl amino)-4,5,7-trimethyl benzothiazole; 2-(2-hydroxy-3-methyl phenyl amino)-4,7-dimethyl benzothiazole; 2-(2,3-dihydroxy phenylamino)-4,7-dimethyl benzothiazole; 2-(2,6-dihydroxy-4-methyl phenyl amino)-4,7-dimethyl benzothiazole and 2-(2-hydroxy-3-methyl-6-chlorophenyl amino)-4-methyl-6-hexyl benzothiazole.

Further compounds usable as metal deactivators are the o-hydroxy polycyclic aryl amino benzothiazoles including 2-(2-hydroxy-α-naphthyl amino) benzothiazole; 2-(1-hydroxy-β-naphthyl amino) benzothiazole; 2-(2-hydroxy-α-anthryl amino) benzothiazole; 2-(1-hydroxy-β-anthryl amino) benzothiazole; 2-(4-hydroxy acenaphthen-yl-3-amino) benzothiazole; 2-(2-hydroxy - 5 - methyl-α-naphthyl amino) benzothiazole; 2-(2-hydroxy-5,7-dimethyl-α-naphthyl amino) benzothiazole; 2-(2-hydroxy-7-methoxy-α-naphthyl amino) benzothiazole; 2-(2,5-dihydroxy-α-naphthyl amino) benzothiazole; 2-(2,7-dihydroxy-α-naphthyl amino) benzothiazole; 2-(1,7-dihydroxy-β-naphthyl amino) benzothiazole; 2-(2-hydroxy-5-methyl-α-naphthyl amino) benzothiazole; 2-(2-hydroxy-7-ethoxy-α-naphthyl amino) benzothiazole; 2-(1-hydroxy-5-chloro-β-naphthyl amino) benzothiazole; 2-(2-hydroxy-5-methoxy-7-ethyl-α-naphthyl amino) benzothiazole and 2-(2-hydroxy-5-chloro-7-methyl-α-naphthyl amino) benzothiazole.

Also usable as the new metal deactivators are o-hydroxy polycyclic arylamino alkyl-substituted benzothiazoles including 2-(2-hydroxy-α-naphthyl amino)-4-methyl benzothiazole; 2-(2-hydroxy-α-naphthyl amino)-5,6-dimethyl benzothiazole; 2-(1-hydroxy-β-naphthyl amino)-4,5,7-trimethyl benzothiazole; 2-(2-hydroxy - α - anthryl amino)-5-methyl benzothiazole; 2-(2-hydroxy-5-methyl-α-naphthyl amino)-6-methyl benzo thiazole; 2-(2-hydroxy-7-chloro-α-naphthyl amino)-5-methyl benzothiazole; 2-(2-hydroxy-5-methoxy-α-naphthyl amino)-5,7-dimethyl benzothiazole; 2-(1,7-dihydroxy-β-naphthyl amino)-5-methyl benzothiazole and 2-(2-hydroxy-5-methyl-7-chloro-α-naphthyl amino)-7-ethyl benzothiazole.

In addition to the benzothiazole derivatives indicated above, the corresponding or equivalent benzoxazoles may be used as metal deactivators, for example, 2-(2-hydroxy phenylamino) benzoxazole; 2-(2-hydroxy-6-methylphenyl amino) benzoxazole; 2-(2-hydroxy-3-ethoxy phenyl amino) benzoxazole; 2-(2-hydroxy-α-naphthyl amino) benzoxazole; 2-(1-hydroxy-β-naphthyl amino) benzoxazole; 2-(2-hydroxy-5-chlorophenyl amino)-5-methyl benzoxazole as well as similarly substituted o-hydroxy aryl benzoxazoles.

In addition to the individual compounds of the type listed above, mixtures of these may be used as metal deactivators in accordance with the invention. Furthermore, mixtures of these compounds with other compatible known metal deactivators in order to obtain special deactivating effects with particular metal impurities or with particular oxidizable organic substances may also be used.

The metal deactivators of this invention may be prepared in several ways. However, it has been discovered that they may be produced in satisfactory yields and with a reasonable degree of purity by reacting 2-chloro benzothiazole, 2-chloro benzoxazole, or the proper substituted derivative thereof with the required o-hydroxy amino aryl compound.

EXAMPLES

A more complete understanding of the novel compositions of matter and their method of preparation provided by this invention may be had by reference to the following examples, in which all parts or percentages are by weight unless otherwise specified.

*Example 1*

There are mixed together in a suitable reaction vessel equipped with means for heating the vessel contents, 110 parts of 2-amino phenol, 170 parts of 2-chloro benzothiazole and 500 parts of ethylene glycol. This reaction mixture is then heated to 150 to 165° C. and maintained at this temperature for approximately one hour to permit the reaction to be completed. The reaction mixture is then allowed to cool to ambient temperature and 1000 parts of water are added to dilute the mixture. This causes crystals of the reaction product to precipitate and these are separated from the reaction mixture by filtration. The separated reaction product is found to have a melting point of 178° C., a nitrogen content of 11.42% and a sulfur content of 12.64% and consists of reasonably pure 2-(2-hydroxy phenylamino) benzo thiazole.

*Example 2*

A solution is formed by dissolving 400 parts of butadiene-styrene rubber (SBR-1006) in 4000 parts of benzene and then further dissolving therein the following ingredients:

| | Parts |
|---|---|
| Styrenated phenol rubber anti-oxidants | 5 |
| Ferric stearate | 0.012 |

The resulting solution is divided into five equal portions, and one of these is poured onto and allowed to flow out on a sheet of aluminum foil. The benzene is then evaporated at room temperature from the thin film of solution, forming a thin layer of unvulcanized rubber composition. This thin layer is next stripped from the aluminum foil and several small, rectangular samples are cut from the stripped film. After being weighed, the samples are placed in an oxygen absorption apparatus and tested for oxygen absorption at 90° C., in accordance with the standardized test reported at "Industrial and Engineering Chemistry," vol. 38, p. 71 (1946).

*Example 3*

There is dissolved in the second of the five equal portions of rubber solution of Example 2, one part of the product of Example 1. Rectangular samples of rubber film from the resulting solution are prepared and tested for oxygen absorption, following the procedure of Example 2.

*Example 4*

The operations of Example 3 are repeated with the fourth of the solution portions from Example 2 and one part of mercapto benzimidazole (a commercially available metal deactivator) in place of the reaction product of Example 1.

*Example 5*

The operations of Example 3 are repeated with the last of the solution portions and two parts of disalicylal propylene diamine (a commercially available metal deactivator) in place of the reaction product of Example 1. The results of these tests are reported below:

TABLE I

| Product of Example | Hours to 2% oxygen | Percent Improvement |
|---|---|---|
| 2 | 14 | |
| 3 | 700 | 2,040 |
| 4 | 22 | 57 |
| 5 | 32 | 129 |

*Example 6*

A sample of a Pennsylvania thermally cracked gasoline is subjected to a standard oxygen bomb stability test (SAEJ 24, 584, 1929) and the results are reported in accordance with the test as the induction period in minutes, namely 100 minutes.

To another sample of the same gasoline, there is added 0.01% of a gum inhibitor comprising 80% of N-n-butyl-4-amino-phenol and 20% of N-N'-dibutyl-4-phenylene diamine. This inhibited gasoline is then subjected to the same stability test and found to possess an induction period of 580 minutes. With 2 p.p.m. of copper added to the inhibited gasoline, the induction period is found to be 170 minutes.

To another sample of the inhibited gasoline containing 2 p.p.m. of copper, 0.0005% of the metal deactivator produced in Example 1 is added to the gasoline mixture, and the resulting product is then subjected to the same stability test. In this case, the treated gasoline is found to have an induction period of 450 minutes.

As demonstrated by the above examples, the new metal deactivators of this invention are particularly useful in stabilizing synthetic rubber of the butadiene-styrene type. However, the new metal deactivators have been found to be useful in stabilizing all other types of elastomeric diene polymers, including natural rubber, butyl rubbers, acrylonitrile-butadiene polymers, polychloroprenes, as well as other elastomeric polymers, including acrylic ester polymers, vinyl ester elastomers and comparable polymeric materials whose oxidative deterioration is accelerated by presence therein of heavy metals or their compounds, particularly Cu, Co, Mn or Fe.

In addition to stabilization of rubbers as above indicated, the new metal deactivators appear to be useful in stabilizing all other forms of organic substances which are subject to metal accelerated oxidative deterioration. Aside from cracked gasoline as above reported, they may be used with hydrocarbon lubricants, vegetable and animal fats and oils, proteins, plasticizers or the like. The deactivators function in solutions of the organic substances as well as in undiluted mixtures.

The new metal deactivators may be incorporated in the organic substances in any suitable manner. The amount needed is very small and will depend to some extent upon the material being stabilized and the amount of contaminating heavy metal compound in the material. With natural and synthetic rubber, the deactivator will be used in about 0.05 to 5 parts per 100 parts of rubber. With gasoline, 5 to 50 p.p.m. are effective. Simple tests will indicate the effective amount to be used in stabilization of any organic composition in question. Generally ten times the weight of deactivator is used per unit weight of contaminating metal in the organic substance to be stabilized.

Normally, the new metal deactivators will be used in conjunction with small amounts of other stabilizing or preserving agents, e.g., anti-oxidants, gum inhibitors or the like. The above examples illustrate this with use of anti-oxidants in rubber compositions and gum inhibitors in gasoline mixtures. Typical augmenting materials include hindered phenols, both monohydric and polyhydric, e.g., dibutyl cresol, bisphenols, butylated octyl phenols; diphenyl amines, e.g., p-isopropoxy diphenylamine; octylated diphenylamines; olyalkyl polyphenols; monoethers of hydroquinone, e.g., hydroquinone monobenzyl ether; p-phenylene diamines, e.g., diphenyl p-phenylene diamine, di-secondary butyl phenylene diamine, di-β-naphthyl-p-phenylene diamine; alkylated phenols; aminophenols, e.g., N-butyl-4-aminophenol, N-methyl-2-dodecyl-4-aminophenol; naphthylamines, e.g., phenyl-β-naphthylamine, aldol-α-naphthylamine; alkyl or aryl phosphites, e.g., tri(p-nonyl phenyl) phosphite, and similar anti-oxidants, gum inhibitors or the like well known to the art. Furthermore, the new metal deactivators may be used in combination, if desired, with any other known metal deactivators, such as those disclosed in the aforementioned U.S. patents. Usually, the supplemental agents will be employed in an amount between 0.0001 and 10 parts per 100 parts of organic substance to be stabilized, e.g., in rubber compositions between about 0.5 and 5% by weight of anti-oxidant will be used with 0.05 to 5% of the metal deactivator.

Having provided a complete description of the invention in such manner as to distinguish it from other inventions and from what is old, and having provided a description of the best mode contemplated of carrying out the invention, the scope of patent protection to be granted the invention is defined by the following claims:

I claim:

1. A method of stabilizing organic substances selected from the group consisting of elastomeric diene polymers, hydrocarbon fuels, hydrocarbon lubricants and vegetable and animal fats and oils subject to oxidative deterioration in the presence of a metal containing material which catalyzes said deterioration, which comprises adding thereto a small amount of a metal deactivator comprising a compound having the structure:

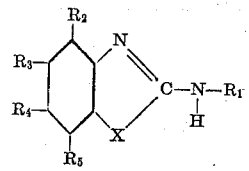

wherein X is a radical selected from the group consisting of oxy and thio, $R_1$ is an o-hydroxy aryl radical having as substituents in addition to the o-hydroxy radical only substituents selected from the group consisting of hydrogen, halogen, hydroxy, alkyl and alkoxy radicals and $R_2$, $R_3$, $R_4$ and $R_5$ are radicals selected from the group consisting of hydrogen and one to four carbon atom alkyl radicals.

2. A method of stabilizing organic substances selected from the group consisting of elastomeric diene polymers, hydrocarbon fuels, hydrocarbon lubricants and vegetable and animal fats and oils subject to oxidative deterioration in the presence of a metal containing material which catalyzes said deterioration, which comprises adding thereto a small amount of a metal deactivator comprising a compound having the structure:

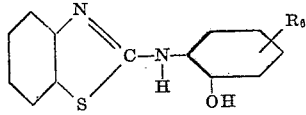

wherein $R_6$ is a radical selected from the group consisting of hydrogen, halogen, hydroxy, $C_1$ to $C_6$ alkyl and $C_1$ to $C_6$ alkoxy radicals.

3. A method of stabilizing organic substances selected from the group consisting of elastomeric diene polymers, hydrocarbon fuels, hydrocarbon lubricants and vegetable and animal fats and oils subject to oxidative deterioration in the presence of a metal containing material which catalyzes said deterioration which comprises adding thereto as a metal deactivator a small amount of a 2-(o-hydroxy arylamino) benzothiazole.

4. A method of stabilizing organic substances selected from the group consisting of elastomeric diene polymers, hydrocarbon fuels, hydrocarbon lubricants and vegetable and animal fats and oils subject to oxidative deterioration in the presence of a metal containing material which catalyzes said deterioration which comprises adding thereto as a metal deactivator a small amount of a 2-(2-hydroxyphenylamino) benzothiazole.

5. The method of claim 1 wherein said organic substance is an elastomeric diene polymer and between about 0.05 and 5 percent by weight, based upon the weight of said polymer, of the metal deactivator is added thereto.

6. The method of claim 1 wherein said organic substance is a cracked petroleum gasoline and between about 5 and 50 p.p.m. of the metal deactivator is added thereto.

7. An organic substance selected from the group consisting of elastomeric diene polymers, hydrocarbon fuels, hydrocarbon lubricants and vegetable and animal fats and oils which is subject to oxidative deterioration in the presence of a metal contaning material which catalyzes said deterioration containing a small amount of a metal deactivator having the structure:

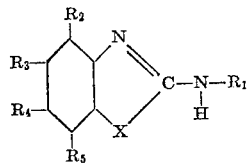

wherein X is a radical selected from the group consisting of oxy and thio, $R_1$ is an o-hydroxy aryl radical having as substituents in addition to the o-hydroxy radical only substituents selected from the group consisting of hydrogen, halogen, hydroxy, alkyl and alkoxy radicals and $R_2$, $R_3$, $R_4$ and $R_5$ are radicals selected from the group consisting of hydrogen and one to four carbon atom alkyl radicals.

8. An organic substance selected from the group consisting of elastomeric diene polymers, hydrocarbon fuels, hydrocarbon lubricants and vegetable and animal fats and oils which is subject to oxidative deterioration in the presence of a metal containing material which catalyzes said deterioration and a small amount of a metal deactivator having the structure:

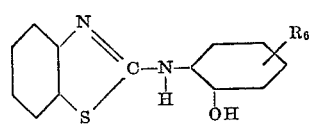

wherein $R_6$ is a radical selected from the group consisting of hydrogen, halogen, hydroxy, $C_1$ to $C_6$ alkyl and $C_1$ to $C_6$ alkoxy radicals.

9. An organic substance selected from the group consisting of elastomeric diene polymers, hydrocarbon fuels, hydrocarbon lubricants and vegetable and animal fats and oils which is subject to oxidative deterioration in the presence of a metal containing material which catalyzes said deterioration containing, as a deactivator for metal containing material present in said substance, a small amount of a 2-(o-hydroxy aryl amino) benzothiazole.

10. An elastomeric diene polymer which is subject to oxidative deterioration in the presence of a metal containing material which catalyzes said deterioration containing, as a deactivator for metal containing material present in said polymer, a small amount of a 2-(2-hydroxy phenyl amino) benzothiazole.

11. An elastomeric composition comprising an elastomeric diene polymer, a metal salt of a heavy metal selected from the group consisting of Cu, Co, Mn and Fe which catalyzes oxidative deterioration of said polymer and, as a deactivator for said metal salt to inhibit the catalytic deterioration effect of said metal salt, a small amount of a 2-(o-hydroxy aryl amino) benzothiazole.

12. A composition of matter comprising an elastomeric diene polymer which is subject to oxidative deterioration in the presence of a metal containing material which catalyzes deterioration and a small amount of a metal deactivator having the structure:

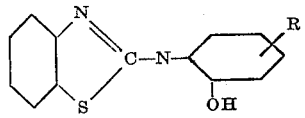

wherein R is a radical selected from the group consisting of hydrogen, halogen, hydroxy, one to six carbon atom alkyl and one to six carbon atom alkoxy radicals.

References Cited in the file of this patent
UNITED STATES PATENTS
2,316,011     Miller et al. _____ Apr. 6, 1943

UNITED STATES PATENT OFFICE
CERTIFICATE OF CORRECTION

Patent No. 3,010,912 November 28, 1961

Albert F. Hardman

It is hereby certified that error appears in the above numbered patent requiring correction and that the said Letters Patent should read as corrected below.

Column 6, line 25, for "olyalkyl" read -- polyalkyl --; column 8, line 8, for "and" read -- containing --.

Signed and sealed this 5th day of June 1962.

(SEAL)
Attest:

ERNEST W. SWIDER
Attesting Officer

DAVID L. LADD
Commissioner of Patents